United States Patent
Yang et al.

(10) Patent No.: US 11,606,428 B2
(45) Date of Patent: Mar. 14, 2023

(54) DATA SYNCHRONIZATION METHOD AND DEVICE

(71) Applicant: BEIJING UNIVERSITY OF POSTS AND TELECOMMUNICATIONS, Beijing (CN)

(72) Inventors: Shaoshi Yang, Beijing (CN); Die Hu, Beijing (CN); Yueyang Hua, Beijing (CN); Luoning Gan, Beijing (CN); Wenzhong Yang, Beijing (CN); Min Gong, Beijing (CN); Xuejun Zhu, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 17/847,324

(22) Filed: Jun. 23, 2022

(65) Prior Publication Data

US 2022/0400152 A1    Dec. 15, 2022

(51) Int. Cl.
*H04L 67/1095*    (2022.01)
(52) U.S. Cl.
CPC .............................. *H04L 67/1095* (2013.01)
(58) Field of Classification Search
CPC ................................................ H04L 67/1095
See application file for complete search history.

(56) References Cited

U.S. PATENT DOCUMENTS

| | | | |
|---|---|---|---|
| 7,936,732 B2 * | 5/2011 | Ho ......................... | H04W 40/32 370/328 |
| 11,438,181 B1 * | 9/2022 | Yamada ................ | H04L 9/3236 |

(Continued)

FOREIGN PATENT DOCUMENTS

| | | |
|---|---|---|
| CN | 1191646 A | 8/1998 |
| CN | 102487306 A | 6/2012 |

(Continued)

OTHER PUBLICATIONS

Jiao XianLong et al.,Network Coding Method Using Heuristic Algorithms for Wireless Ad Hoc Networks,Journal of Software,2010, 21(11).

(Continued)

*Primary Examiner* — Shean Tokuta (57) ABSTRACT

A data synchronization device is provided, including a control module, a data block storage module and an encoding/decoding module. A data synchronization method using the device is also provided, including: selecting, by the control module, a data transmission network node and selecting the to-be-synchronized data block of a data transmission network node from the data storage module; encapsulating the to-be-synchronized data block in a specific format and then broadcasting the encapsulated data, where if there are two or more to-be-synchronized data blocks, the to-be-synchronized data blocks are encoded and then encapsulated; otherwise, the to-be-synchronized data block is directly encapsulated; processing, by the encoding/decoding module, the encapsulated data to obtain the to-be-synchronized data block, and finally inputting the obtained to-be-synchronized data block into the data block storage module.

13 Claims, 2 Drawing Sheets

(56) References Cited

U.S. PATENT DOCUMENTS

| | | | | |
|---|---|---|---|---|
| 2010/0040079 | A1* | 2/2010 | Park | H04L 45/32 370/432 |
| 2013/0028073 | A1* | 1/2013 | Tatipamula | H04L 45/02 370/218 |
| 2013/0215769 | A1* | 8/2013 | Beheshti-Zavareh | H04L 41/0836 370/252 |
| 2013/0279398 | A1* | 10/2013 | Cha | H04W 84/18 370/315 |
| 2015/0146534 | A1* | 5/2015 | Lim | H04W 4/06 370/235 |
| 2015/0156738 | A1* | 6/2015 | Guo | H04W 56/002 709/236 |
| 2016/0165406 | A1* | 6/2016 | Ko | H04W 4/06 370/315 |
| 2018/0069944 | A1* | 3/2018 | Yang | H04L 41/5009 |

FOREIGN PATENT DOCUMENTS

| | | | | |
|---|---|---|---|---|
| CN | 102883466 | A | | 1/2013 |
| CN | 103078934 | A | | 5/2013 |
| CN | 105472718 | A | | 4/2016 |
| CN | 108521316 | A | | 9/2018 |
| CN | 110933137 | A | * | 3/2020 ......... H04L 12/1895 |
| CN | 109886681 | B | * | 6/2021 |
| CN | 113411403 | A | * | 9/2021 |

OTHER PUBLICATIONS

Zhao Xin, Rateless Coding-Enabled and Manageable P2P Streaming Media Distribution Scheme, Modern Electronic Engineering, 2012, 3(5).

Luo Li et al., Energy-saving broadcasting algorithms based on network coding in multi-sink wireless sensor networks, Journal of Guangxi University(Natural Science Edition), 2011, 36(6).

* cited by examiner

Fig. 1

| Type | Num | Packet | Message |
|------|-----|--------|---------|

Fig. 2

| Packet0 | Block0 |
|---------|--------|
| Packet1 | Block1 |
| Packet2 | Block2 |
| ... | ... |

DATA SYNCHRONIZATION METHOD AND DEVICE

CROSS-REFERENCE TO RELATED APPLICATIONS

This application claims the benefit of priority from Chinese Patent Application No. 202110707613.9, filed on Jun. 23, 2021. The content of the aforementioned application, including any intervening amendments thereto, is incorporated herein by reference.

TECHNICAL FIELD

This application relates to communication and network technology, and more particularly to a data synchronization method and device.

BACKGROUND

To enhance the cooperation efficiency of individual nodes in a distributed information sharing network (such as a sensor network, a robot network, and an unmanned aerial vehicle network), and achieve the functions of real-time optimal decision and control, it is necessary to accelerate the information sharing among nodes to achieve rapid data synchronization, so as to provide sufficient and reliable basic input information for the related algorithms. Therefore, the rapid data synchronization among nodes in a distributed network is significant. More specifically, the rapid data synchronization among nodes in a distributed network refers to delivering the information to be shared by any one of the nodes to other nodes in the network in a broadcast manner as fast as possible in the support of a wired or wireless network.

At present, research on rapid data synchronization among nodes in a distributed network includes the following two aspects. Firstly, based on the traditional storage-forwarding mechanism of node's data, each node perceives the network state by using the prior information of other nodes in the network besides the said node as much as possible to optimize the broadcast protocol. The core idea of the scheme is to avoid network congestion and conflict caused by a large amount of broadcast information generated in the data synchronization process, thereby affecting the data synchronization performance. Secondly, based on the network coding aided coding-forwarding mechanism, each node adaptively selects the modulation and coding mode of any data block by fusing information of multiple protocol layers (such as the physical layer, and the media access layer), so as to improve the data synchronization efficiency and the network adaptability.

Regarding an inter-node data synchronization strategy based on a traditional storage-forwarding mechanism, since each node does not perform additional calculation-based processing on the data block, one broadcast can only transmit one data block, and in the data synchronization process, some nodes may repeatedly receive the same data block multiple times. For a given sending node, the number of neighbor nodes receiving new data block in the primary data transmission process is small, and the data synchronization efficiency is low. At the same time, reasons such as the random deployment of nodes may cause the existence of "bottleneck" nodes connecting two or more regions in the network. Limited by the conclusion that the bit stream cannot be compressed, namely the network information flow cannot be compressed, as claimed in the classical information theory, the messages cannot be quickly passed through the "bottleneck" node, which restricts the efficiency of data synchronization and the network throughput.

For inter-node data synchronization strategies based on a traditional coding-forwarding mechanism, the network coding relied on by the prior art utilizes more state information from other protocol layers to assist calculation, which may increase the amount of exchanged information among nodes in a data synchronization algorithm and increase the complexity of the algorithm, thereby causing significant storage and computation overhead, and reducing engineering applicability.

SUMMARY

This disclosure provides a method and device based on the network coding and coding-forwarding mechanism for data synchronization among network nodes. The purpose of the proposed method and device is to solve the problems of large overhead associated with information exchange and high computation complexity required for data synchronization among a large number of nodes in a distributed network, to reduce the network load and the data synchronization time, and to better support rapid data synchronization in a distributed information-sharing network.

The technical solutions of the disclosure are described below.

In a first aspect, this application provides a data synchronization device for rapid data synchronization among network nodes. The device can be installed on the related network nodes and comprises:

a control module;
a data block storage module; and
an encoding/decoding module;

wherein the control module is configured to select a data transmission network node, select a to-be-synchronized data block from the data block storage module, and input the to-be-synchronized data block into the encoding/decoding module; the encoding/decoding module is configured to encode and encapsulate the to-be-synchronized data block to obtain encapsulated data, as well as broadcast and decode the encapsulated data, according to network coding/decoding algorithms; wherein if the number of the to-be-synchronized data block is one, the to-be-synchronized data block is encapsulated directly without network-encoding, and if the number of the to-be-synchronized data block is more than one, to-be-synchronized data blocks are network-encoded according to given rules and then encapsulated; afterwards, the encapsulated data are broadcasted;

the to-be-synchronized data block is selected by the control module through steps of:

for a network node n, traversing a to-be-synchronized data block candidate set that is formed by all data blocks stored locally in the network node n, to obtain a data block set as a to-be-synchronized data block set, wherein the to-be-synchronized data block set is selected such that for the network node n the number of its neighbor nodes capable of obtaining a new data block through decoding data that are encapsulated and broadcasted by the network node n reaches a maximum $\beta_n$; and when there are multiple data block sets capable of reaching the maximum $\beta_n$, any of these data block sets can be selected as the to-be-synchronized data block set; if there is only one data block that is involved in an network-encoding process but is not locally stored in a neighbor node of the network node n, the neighbor node is capable of decoding the encapsulated data; and n=1, 2, . . . N, wherein N represents the number of network nodes performing data synchronization;

the data transmission network node is selected by the control module through steps of:

for a network node n, obtaining the maximum $\beta_n$ according to the selected to-be-synchronized data block, and calculating a ratio of $\beta_n/M_n$; selecting a network node with a maximum ratio of $\beta_n/M_n$ from all the network nodes as the data transmission network node, and if there are multiple network nodes that achieve the maximum ratio of $\beta_n/M_n$, selecting any one of them as the data transmission network node, wherein $M_n$ represents the number of neighbor nodes of the network node n; and the encoding/decoding module is configured to process the encapsulated data according to network decoding algorithms to recover the to-be-synchronized data block, and input the to-be-synchronized data block into the data block storage module;

the data block storage module is configured to detect whether the to-be-synchronized data block input from the encoding/decoding module has been stored in the network node; if not, it indicates that the to-be-synchronized data block is a new data block, and then the new data block is stored in the data block storage module.

In a second aspect, this application provides a data synchronization method among network nodes, comprising:

(S1) at an initial stage of data synchronization, determining a to-be-synchronized data block of a network node executing data synchronization; and encapsulating the to-be-synchronized data block without encoding followed by broadcasting;

wherein the to-be-synchronized data block is encapsulated in a specific format; and the specific format comprises a Type field, a Num field, a Packet field, and a Message field; the Type field is configured to identify whether a data block is encoded; the Num field is configured to indicate a total length of encapsulated data blocks; the Message field is configured to store uncoded to-be-synchronized data blocks or encoded to-be-synchronized data blocks; and the Packet field is configured to store an index associated with the to-be-synchronized data block;

(S2) after receiving encapsulated data, allowing a neighbor node to decide whether the to-be-synchronized data block is encoded by examining the Type field; if yes, obtaining the index of the to-be-synchronized data block from the Packet field, and then decoding the Message field to acquire the to-be-synchronized data block; otherwise, directly obtaining the to-be-synchronized data block from the Message field; and if the to-be-synchronized data block is not locally stored in the neighbor node, the to-be-synchronized data block is indicated as a new data block, and then stored locally in the neighbor node;

(S3) allowing individual network nodes to count and update the number of locally stored data blocks; and determining whether the data synchronization is completed by checking if the number of the locally stored data blocks is equal to the number of the to-be-synchronized data block; if yes, ending the data synchronization; otherwise, proceeding to step (S4);

(S4) selecting a to-be-synchronized data block set by individual network nodes through data block selection and determining a data transmission network node through data transmission network node selection, wherein the data block selection comprises:

for a network node n performing the data synchronization, traversing a to-be-synchronized data block candidate set that is formed by all data blocks locally stored in the network node n, to obtain a to-be-synchronized data block set, wherein the to-be-synchronized data block set is selected such that for the network node n, the number of its neighbor nodes capable of obtaining a new data block through decoding data that are encapsulated and broadcasted by the network node n reaches a maximum $\beta_n$, and when there exist multiple data block sets capable of reaching the maximum $\beta_n$, any of these data block sets can be selected as the to-be-synchronized data block set; wherein if there is only one data block that is involved in an network-encoding process but is not locally stored in a neighbor node of the network node n, the neighbor node is capable of decoding the encapsulated data; and the data transmission network node selection comprises:

calculating a ratio of $\beta_n/M_n$; selecting a network node with a maximum ratio of $\beta_n/M_n$ as the data transmission network node, and if there exist multiple network nodes that achieves the maximum ratio of $\beta_n/M_n$, selecting any one of the network nodes as the data transmission network node, wherein $M_n$ represents the number of the neighbor nodes of the network node n; and n=1, 2, . . . N, with N representing the number of network nodes performing the data synchronization; and (S5) performing encoding and encapsulation, by the data transmission network node, on a data block contained in the to-be-synchronized data block set, followed by broadcasting and returning to step (S2), wherein if the number of the data block in the to-be-synchronized data block set is one, the data block is directly encapsulated without encoding to obtain an uncoded data block, and an uncoded mark of the uncoded data block is stored in the Type field, and if the number of the data block in the to-be-synchronized data block set is more than one, the data blocks are encoded to obtain an encoded data block and then stored in the Message field, and an encoded mark of the encoded data block is stored in the Type field, and an index associated with the to-be-synchronized data block is stored in the Packet field.

Compared to the prior art, the present disclosure has the following beneficial effects.

The data synchronization method and device provided herein are designed based on linear network coding to enable the rapid synchronization among network devices. A more efficient coding-forwarding mechanism is adopted, and the advantages of network coding are fully exerted through the selection of the data transmission node and the to-be-synchronized data block, thus lowering the calculation complexity, increasing the data volume distributed in one data transmission, attenuating the influence of bottleneck nodes, and improving the network performance. Compared with the traditional storage-forwarding mechanism, the disclosure has reduced the total number of time slots occupied by data synchronization, improved data synchronization efficiency, and enhanced network throughput. Therefore, the device and method provided herein are of important significance for the data synchronization among network nodes.

DETAILED DESCRIPTION OF EMBODIMENTS

This application provides a method and a device for rapid data synchronization among network devices. By using a network coding technology involving broadcasting and linear coding operation, the data transmission efficiency is improved. The present disclosure will be described in detail below with reference to the accompanying drawings and embodiments.

Figure 1:
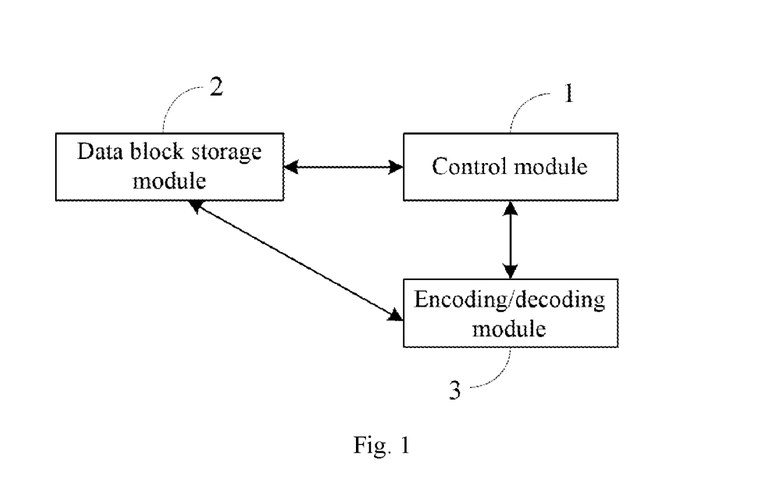
FIG. 1 schematically shows a structure of a data synchronization device according to an embodiment of the present disclosure.

As shown in FIG. 1, a data synchronization device is provided in an embodiment, which includes a control module 1, a data block storage module 2, and an encoding/decoding module 3. The device is configured on individual network nodes that are involved in the data synchronization, so as to complete the data synchronization function among network nodes.

The control module 1 is configured to complete selection of a to-be-synchronized data block, and selection of a data transmission network node, as well as the overall control.

The control module 1 is specifically configured to complete the tasks in the following two processes in the data synchronization.

(1) Data Transmission Process

A data transmission network node is selected by a transmission node selection method provided herein, and the to-be-encoded data block is selected by a to-be-synchronized data block selection method provided herein under the assistance of the data blocks stored in the data block storage module 2 and then input in the encoding/decoding module 3. The selection method of the data transmission network node and the selection method of the to-be-synchronized data block are described later.

(2) Overall Control Process

By comparing whether the number of data blocks locally stored in the data block storage module 2 and the total number of data blocks required to be synchronized in the current data synchronization process is equal, determine whether the present network node has obtained all the information of the other nodes in the network, and if not, it indicates that the present network node fails to completely acquire the information of the other nodes, and the present network node fails to complete the data synchronization; otherwise, the present network node has completed the data synchronization. After that, whether all the network nodes have completed data synchronization or not is judged, and if the data synchronization is completed, ending the current data synchronization task, and waiting for the next data synchronization task; otherwise, continuing to perform the data synchronization process.

The data block storage module 2 is configured to complete extraction, storage and processing of the data block under the control of the control module 1, and it is specifically configured to complete the tasks in the following two processes in the data synchronization.

(1) Data Sending Process

The to-be-encoded data block selected by the control module 1 is extracted from the data block storage module 2, and are input to the encoding/decoding module 3.

(2) Data Receiving Process

Figure 3:
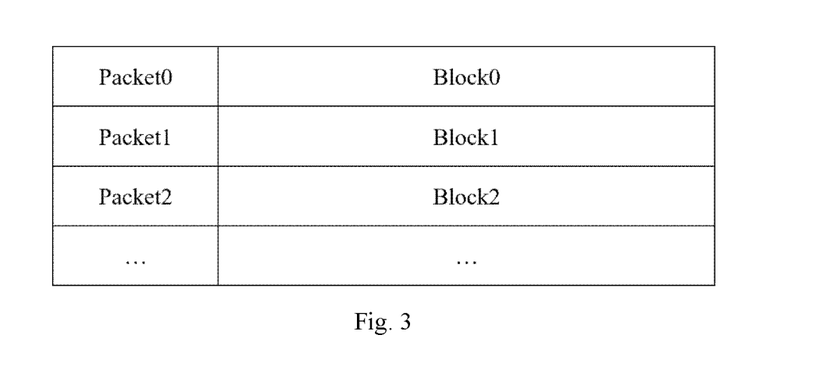
FIG. 3 is a schematic diagram of storage formats of a data block storage module according to an embodiment of the present disclosure.

The information of the stored data blocks is provided to the encoding/decoding module 3 to assist the encoding/decoding module 3 to complete decoding. The data blocks obtained by the encoding/decoding module 3 via decoding are compared with the data blocks stored in the present network node, and if there is a data block different from the stored data blocks, the data block is configured as a new data block and stored in the data block storage module 2 according to the storage format as shown in FIG. 3; otherwise, no operation is performed.

The encoding/decoding module 3 is mainly configured to complete encoding and decoding operations of the data blocks, and is specifically configured to complete the tasks in the following two processes in the data synchronization.

(1) Data Transmission Process

Figure 2:
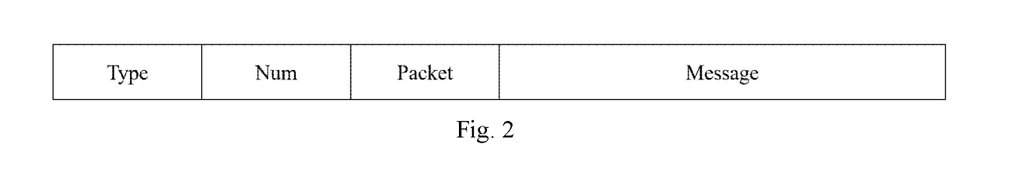
FIG. 2 schematically shows formats of encapsulation during data synchronization according to an embodiment of the present disclosure.

The encoding/decoding module 3 extracts the to-be-synchronized data block selected by the control module 1 from the data block storage module 2, and if the number of selected data blocks is greater than 1, the selected data blocks are encoded in a specified linear encoding mode, where the one-time data synchronization process can only specify one encoding mode, and the encoded data blocks are encapsulated in a specific format as shown in FIG. 2 to perform data transmission; otherwise, encoding is not performed, and the selected one data block is directly broadcasted after being encapsulated in a specific format as shown in FIG. 2.

(2) Data Receiving Process

After the encoding/decoding module 3 acquires the data packet encapsulation in the specific format, whether the data is encoded or not is judged according to the information contained in the data packet encapsulation; and if the data packet is uncoded, the data block is directly input to the data block storage module 2; otherwise, according to the decoding rule corresponding to the specified encoding mode and under the assistance of the stored data blocks in the data block storage module 2, determine whether the data block can be decoded based on the conditions of judging whether the encapsulated data are decodable; and if yes, the decoded data block is input to the data block storage module 2 for processing; otherwise, no operation is performed.

As shown in FIG. 2, the specific formats of the data packet encapsulation in the data synchronization process includes the following fields:

TYPE, which is configured to indicate the type of the received data packet, and to distinguish whether the data packet is encoded or not;

Num, which is configured to indicate the total length of the encapsulated data blocks;

Packet, which is configured to indicate the index of the to-be-synchronized data block contained in the "Message" field; and Message, which is configured to store uncoded to-be-synchronized data blocks or data obtained by encoding the to-be-synchronized data blocks.

The length and position of the above fields can be adjusted according to the actual requirements of the network. For example, the "Packet" field can be replaced by other information that can uniquely index a data block, and the "Num" field can be replaced by other information that can indicate the length of the data packet.

FIG. 3 shows the storage format of the data block storage module, wherein the formats of the specific fields are defined as follows:

Packet, which is configured to indicate a data block index; and

Block, which is configured to indicate a data block content.

The length and the position of the above fields can be adjusted according to the actual requirements of the network.

For a distributed system, any network node can serve as a central point of a local area, and can also be used as an edge leaf node of a distributed system. Therefore, the data synchronization method provided herein can be simplified by adopting a centralized method partially in a distributed system and globally in a centralized system.

Figure 4:
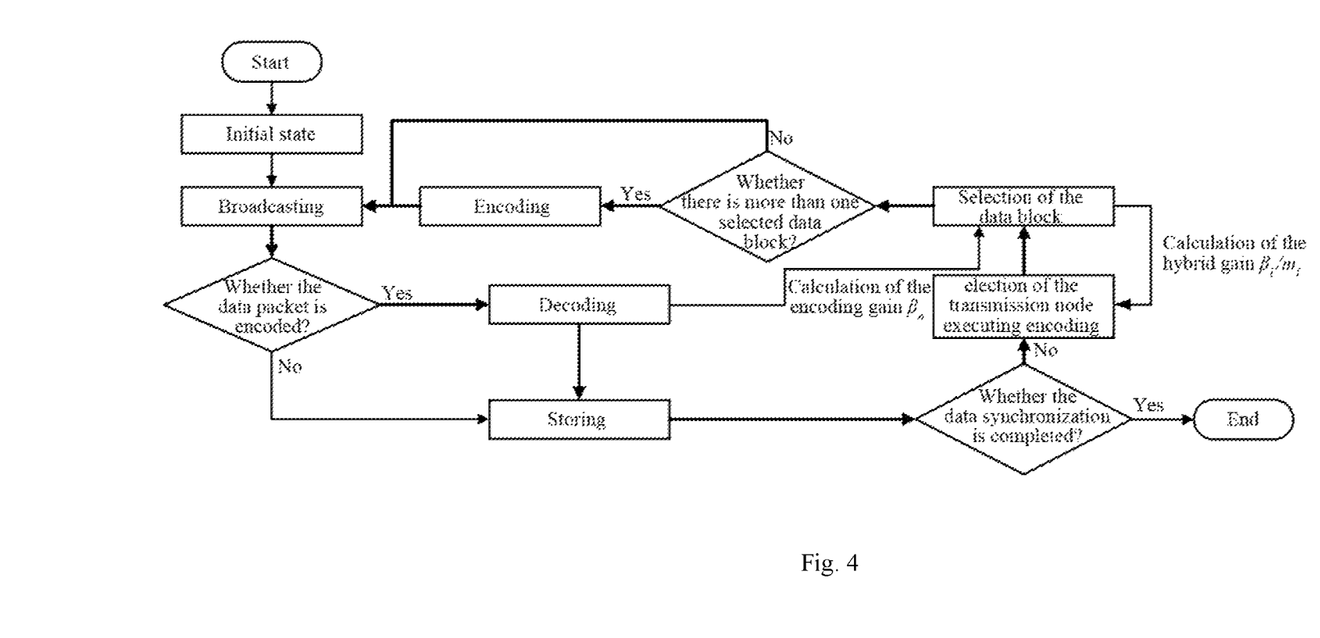
FIG. 4 is a schematic flowchart of a data synchronization method according to an embodiment of the present disclosure.

As shown in FIG. 4, a data synchronization method is provided in an embodiment of the present disclosure, which includes the following steps.

(S0) At an initialization stage of data synchronization, the to-be-synchronized data blocks of a network node are determined, where the to-be-synchronized data blocks may be obtained by acquiring the state of the network node itself or the state of the environment, and a single network node may have multiple to-be-synchronized data blocks. The encoding/decoding module 3 encapsulates the to-be-synchronized data blocks, where the "uncoded" mark is stored in the "Type" field of the encapsulated data with a specific format, the indices of the to-be-synchronized data blocks are stored in the "Packet" field of the encapsulated data, the to-be-synchronized data blocks are directly stored in the "Message" field of the encapsulated data, and the total length of the data blocks is stored in the "Num" field of the encapsulated data. After that, proceeding to step (S1).

(S1) The encapsulated data constituted in a specific format by the to-be-synchronized data blocks of the individual network nodes are broadcasted to their neighbor nodes in a specific manner, such as the Time Division Multiple Access (TDMA). After that, proceeding to step (S2).

(S2) After receiving the encapsulated data, whether the to-be-synchronized data block is encoded or not is determined according to the "Type" field in the encapsulated data; and if yes, the to-be-decoded data blocks stored in the data block storage module 2 are extracted according to the indices of the to-be-synchronized data blocks specified in the "Packet" field of the encapsulated data; then the "Message" field in the encapsulated data is decoded in the encoding/decoding module 3 according to the decoding rule that corresponds to the specific encoding rule; after obtaining the decoded data blocks, they are input into the data block storage module 2 of the network node; subsequently, these decoded data blocks are compared with the data blocks earlier stored in the data block storage module 2 before the network node receives the encapsulated data, and if in the decoding result there is any data block different from the aforementioned earlier stored data blocks, then this data block is stored in the data block storage module 2, otherwise, no storage operation is performed for this data block. If the "Type" field indicates that no encoding is performed, the data block in the "Message" field of the encapsulated data is directly input into the data block storage module 2 and compared with the earlier stored data blocks; and if the data block of the encapsulated data is different from the earlier stored data blocks, then this data block is stored in the data block storage module 2, otherwise, no storage operation is performed for this data block, and proceeding to step (S3).

(S3) The number of data blocks stored locally in their own data block storage module is counted and updated by individual network nodes. By checking whether the number of locally stored data blocks is equal to the total number of the to-be-synchronized data blocks, the individual network nodes determine whether their respective data synchronization task is completed, if all the numbers are the same, the data synchronization is regarded to be completed; otherwise, proceeding to step (S4).

(S4) The transmission node executing network encoding operation is selected according to the aforementioned transmission node selection method, and then proceed to step (S5).

(S5) The to-be-synchronized data blocks are selected by the data block selection method, and then proceed to step (S6).

(S6) The transmission node selected for executing network encoding in step (S4) extracts the data blocks selected in step (S5) from the data block storage module 2 by invoking the encoding/decoding module 3, and if the number of the extracted data blocks is one, the "uncoded" mark is stored in the "Type" field of the encapsulated data with a specific format, the index of the extracted data block is stored in the "Packet" field of the encapsulated data with a specific format, the extracted data block is directly stored in the "Message" field of the encapsulated data with a specific format, and the total length of the extracted data block is stored in the "Num" field of the encapsulated data with a specific format; otherwise, the extracted data blocks are input into the encoding/decoding module 3 to perform encoding, the "encoded" mark is stored in the "Type" field of the encapsulated data with a specific format, the indices of the to-be-synchronized data blocks are stored in the "Packet" field of the encapsulated data with a specific format, the encoded data blocks are stored in the "Message" field of the encapsulated data with a specific format, and the total length of the to-be-synchronized data blocks is stored in the "Num" field of the encapsulated data with a specific format, and proceeding to step (S2).

The conditions for determining whether the network node can decode the encapsulated data, the data block selection method, and the transmission node selection method are also provided in this invention, as described below.

First, the variables used herein are described as follows.

$\mathbb{A}_n$ represents a set of data blocks stored in network node n.

$\mathbb{\bar{A}}_{n_k}$ represents a set of data blocks not stored in network node $n_k$;

$\mathbb{\tilde{A}}_n$ represents a set of to-be-synchronized data block candidates stored in the network node n.

$\mathbb{\tilde{A}}_n$ initially contains all the data blocks locally stored in the network node n, and after the selection of data blocks, $\mathbb{\tilde{A}}_n$ is composed of the to-be-synchronized data blocks.

The conditions for determining whether the network node can decode the encapsulated data are described as follows.

When only one data block in the to-be-synchronized data blocks is unknown, the receiver can decode the encapsulated data to obtain a new data block, that is, for the data transmission network node n, if the selected to-be-encoded data block is $\mathbb{\tilde{A}}_n$, the condition that the encapsulated data is decodable in the neighbor node $n_k$ is $|\mathbb{\tilde{A}}_n \cap \mathbb{\bar{A}}_{n_k}|=1$.

The data block selection method is described below.

The number $\beta_n$ of nodes capable of obtaining a new data block from the encapsulated data in all the neighbor nodes of the node n is defined as the encoding gain:

$$\beta_n = \sum_j^{m_n} \varepsilon_{nj},$$

where $$\varepsilon_{nj} = \begin{cases} 1 & |\mathbb{A}_n \cap \mathbb{A}_{n_j}| = 1 \\ 0 & \text{otherwise} \end{cases};$$

j represents the index of a neighbor node. $\varepsilon_{nj}$ indicates whether the neighbor node $n_j$ of the node n can decode the encapsulated data, and when the value of $\varepsilon_{nj}$ is 1, it indicates that the encapsulated data can be decoded, and when the value of $\varepsilon_{nj}$ is 0, it indicates that the encapsulated data cannot be decoded; and $m_n$ represents the number of all the neighbor nodes of the node n.

As for the data blocks in $\tilde{\mathbb{A}}_n$, if a data block set $\tilde{\mathbb{A}}_n$ is the solution to the optimization problem $$\max_{\tilde{\mathbb{A}}_n \subseteq \mathbb{A}_n} \beta_n,$$

then the data blocks in this set are the data blocks to be involved in the network encoding operation of the node n.

By traversing $\tilde{\mathbb{A}}_n$, a to-be-synchronized data block set that can maximize the value of $\beta_n$ is obtained, and it is allowable to have only one to-be-synchronized data block included in the obtained to-be-synchronized data block set. If a plurality of to-be-synchronized data block sets capable of maximizing the value of $\beta_n$ are obtained, any one set is selected from the plurality of to-be-synchronized data block sets.

The transmission node selection method is described as follows.

For any node i, where i=1, 2 . . . , N; N represents the number of network nodes performing data synchronization, and the number of neighbor nodes of the node i is $m_i$. If $m_i$ satisfies the condition:

$$\max_i \beta_i / m_i,$$

then the node i is configured as the selected encoding node, where $\beta_i$ is calculated by the node i according to the data block selection method and it represents the maximum number of neighbor nodes that are capable of obtaining a new data block from the encapsulated data sent by the node i among all the neighbor nodes of the node i; $\beta_i/m_i$ is called the hybrid gain, which represents the ratio of the neighbor nodes that can be helped among all the neighbor nodes of the selected node per broadcast or per time slot. When a plurality of identical maximum ratios of $\beta_i/m_i$ are obtained, any one node i is selected as the transmission node.

As far as a distributed sensor system where the sensors are randomly deployed is concerned, after fully sensing the position of each other, a data synchronization strategy as shown in FIG. 4 is formulated for this scenario. Firstly, any to-be-synchronized data block is assigned with a transmission time slot, and any sensor broadcasts the encapsulated data blocks to its neighbor nodes according to the assigned transmission time slot. The neighbor nodes store the received data blocks and then determine whether the total number of data blocks stored in the present node is the same as the total number of to-be-synchronized data blocks. If the number of data blocks stored on all the individual nodes is equal to the total number of to-be-synchronized data blocks, the data synchronization is completed, and the process comes to an end; otherwise, the data transmission network node is selected for the next time slot according to the transmission node selection method, then the to-be-synchronized data blocks are selected according to the data block selection method, and then these data blocks are encapsulated and broadcasted again. This process is repeated until the data synchronization is completed.

What is claimed is:

1. A data synchronization device for data synchronization among network nodes, comprising:
   a control module;
   a data block storage module; and
   an encoding/decoding module;
   wherein the control module is configured to select a data transmission network node, select a to-be-synchronized data block from the data block storage module, and input the to-be-synchronized data block into the encoding/decoding module; the encoding/decoding module is configured to encode and encapsulate the to-be-synchronized data block, as well as broadcast and decode the encapsulated data, according to network coding/decoding algorithms; wherein if the number of the to-be-synchronized data block is one, the to-be-synchronized data block is encapsulated directly without network-encoding, and if the number of the to-be-synchronized data block is more than one, to-be-synchronized data blocks are network-encoded according to given rules and then encapsulated; afterwards, the encapsulated data are broadcasted;
   the to-be-synchronized data block is selected by the control module through steps of:
      for a network node n, traversing a to-be-synchronized data block candidate set that is formed by all data blocks stored locally in the network node n, to obtain a data block set as a to-be-synchronized data block set, wherein the to-be-synchronized data block set is selected such that for the network node n, the number of its neighbor nodes capable of obtaining a new data block through decoding data that are encapsulated and broadcasted by the network node n reaches a maximum $\beta_n$; and when there is only one data block that is involved in a network-encoding process but is not locally stored in a neighbor node of the network node n, the neighbor node is capable of decoding the encapsulated data;
   and n=1, 2, . . . N, wherein N represents the number of network nodes performing data synchronization;
   the data transmission network node is selected by the control module through steps of:
      for a network node n, obtaining the maximum $\beta_n$ according to the to-be-synchronized data block, and calculating a ratio of $\beta_n/M_n$; selecting a network node with a maximum ratio of $\beta_n/M_n$ from all network nodes as the data transmission network node, wherein $M_n$ represents the number of neighbor nodes of the network node n; and
   the encoding/decoding module is configured to process the encapsulated data according to network decoding algorithms to recover the to-be-synchronized data block, and input the to-be-synchronized data block into the data block storage module.

2. The data synchronization device of claim 1, wherein the encoding/decoding module is configured to encapsulate encoded or uncoded data blocks in a specific format; and the specific format comprises a Type field, a Num field, a Packet field, and a Message field, wherein the Type field is configured to identify whether data blocks are encoded; the Num field is configured to indicate a total length of encapsulated data blocks; the Packet field is configured to store an index associated with the to-be-synchronized data block; and the Message field is configured to store uncoded to-be-synchronized data blocks or encoded to-be-synchronized data blocks.

3. The data synchronization device of claim 2, wherein the encoding/decoding module is configured to determine whether the to-be-synchronized data block is encoded according to the Type field in the encapsulated data, if yes, indices of data blocks involved in encoding are obtained from the Packet field, and the to-be-synchronized data block is acquired by decoding the Message field; and if not, the to-be-synchronized data block is directly obtained from the Message field.

4. The data synchronization device of claim 1, wherein after each data synchronization process is executed, the control module is configured to determine whether the number of data blocks stored in the data block storage module of a current network node is equal to the number of data blocks required to be synchronized in a current data synchronization process, if not, it indicates that data synchronization with respect to the current network node is not completed, and if yes, it indicates that the data synchronization with respect to the current network node has been completed.

5. The data synchronization device of claim 2, wherein after each data synchronization process is executed, the control module is configured to determine whether the number of data blocks stored in the data block storage module of a current network node is equal to the number of data blocks required to be synchronized in a current data synchronization process, if not, it indicates that data synchronization with respect to the current network node is not completed, and if yes, it indicates that the data synchronization with respect to the current network node has been completed.

6. The data synchronization device of claim 3, wherein after each data synchronization process is executed, the control module is configured to determine whether the number of data blocks stored in the data block storage module of a current network node is equal to the number of data blocks required to be synchronized in a current data synchronization process, if not, it indicates that data synchronization with respect to the current network node is not completed, and if yes, it indicates that the data synchronization with respect to the current network node has been completed.

7. The data synchronization device of claim 1, wherein the control module is configured to determine all to-be-synchronized data blocks of a current network node at an initial stage of data synchronization, and then encapsulate and broadcast the to-be-synchronized data blocks without encoding.

8. The data synchronization device of claim 2, wherein the control module is configured to determine all to-be-synchronized data blocks of a current network node at an initial stage of data synchronization, and then encapsulate and broadcast the to-be-synchronized data blocks without encoding.

9. The data synchronization device of claim 3, wherein the control module is configured to determine all to-be-synchronized data blocks of a current network node at an initial stage of data synchronization, and then encapsulate and broadcast the to-be-synchronized data blocks without encoding.

10. The data synchronization device of claim 1, wherein the data block storage module is configured to detect whether the to-be-synchronized data block input by the encoding/decoding module is stored in a current network node, if not, the to-be-synchronized data block is indicated as a new data block, and then stored in the data block storage module.

11. A data synchronization method, comprising:
(S1) at an initial stage of data synchronization, determining a to-be-synchronized data block of a network node executing data synchronization; and encapsulating the to-be-synchronized data block without encoding followed by broadcasting;
(S2) after receiving encapsulated data, allowing a neighbor node to acquire the to-be-synchronized data block from the encapsulated data; and if the to-be-synchronized data block is not locally stored in the neighbor node, the to-be-synchronized data block is indicated as a new data block, and then stored locally in the neighbor node;
(S3) allowing individual network nodes to count and update the number of locally stored data blocks; and determining whether the data synchronization is completed, if yes, ending the data synchronization; otherwise, proceeding to step (S4);
(S4) selecting a to-be-synchronized data block set by individual network nodes and determining a data transmission network node through steps of:
for a network node n performing the data synchronization, traversing a to-be-synchronized data block candidate set that is formed by all data blocks locally stored in the network node n to obtain a to-be-synchronized data block set, wherein the to-be-synchronized data block set is configured such that for the network node n, the number of its neighbor nodes capable of obtaining a new data block through decoding data that are encapsulated and broadcasted by the network node n reaches a maximum $\beta_n$; wherein if there is only one data block that is involved in a network-encoding process but is not locally stored in a neighbor node of the network node n, the neighbor node is capable of decoding the encapsulated data; calculating a ratio of $\beta_n/M_n$; selecting a network node with a maximum ratio of $\beta_n/M_n$ as the data transmission network node, wherein $M_n$ represents the number of the neighbor nodes of the network node n; and n=1, 2, ... N, with N representing the number of network nodes performing the data synchronization; and
(S5) performing encoding and encapsulation, by the data transmission network node, on a data block contained in the to-be-synchronized data block set, followed by broadcasting, and returning to step (S2), wherein if the number of the data block in the to-be-synchronized data block set is one, the data block is encapsulated without encoding, and if the number of the data block in the to-be-synchronized data block set is more than one, data blocks are encoded and then encapsulated.

12. The data synchronization method of claim 11, wherein in step (S1), the to-be-synchronized data block is encapsulated in a specific format; and the specific format comprises a Type field, a Num field, a Packet field, and a Message field, wherein the Type field is configured to identify whether a data block is encoded; the Num field is configured to indicate a total length of encapsulated data blocks; the Packet field is configured to store an index of the to-be-synchronized data block; and the Message field is configured to store uncoded to-be-synchronized data blocks or encoded to-be-synchronized data blocks.

13. The data synchronization method of claim 11, wherein in step (S2), after receiving encapsulated data, the neighbor node determines whether the to-be-synchronized data block is encoded according to a Type field, if yes, the index of the to-be-synchronized data block is obtained from the Packet field, and the to-be-synchronized data block is acquired by decoding a Message field; and if not, the to-be-synchronized data block is directly obtained from the Message field.

* * * * *